United States Patent
Cao et al.

(10) Patent No.: US 11,663,513 B2
(45) Date of Patent: May 30, 2023

(54) QUANTUM COMPUTER WITH EXACT COMPRESSION OF QUANTUM STATES

(71) Applicant: Zapata Computing, Inc., Cambridge, MA (US)

(72) Inventors: Yudong Cao, Cambridge, MA (US); Peter D. Johnson, Somerville, MA (US)

(73) Assignee: Zapata Computing, Inc., Boston, MA (US)

( * ) Notice: Subject to any disclaimer, the term of this patent is extended or adjusted under 35 U.S.C. 154(b) by 878 days.

(21) Appl. No.: 16/543,470

(22) Filed: Aug. 16, 2019

(65) Prior Publication Data

US 2021/0374550 A1    Dec. 2, 2021

Related U.S. Application Data

(60) Provisional application No. 62/823,172, filed on Mar. 25, 2019, provisional application No. 62/719,391, filed on Aug. 17, 2018.

(51) Int. Cl.
*G06N 10/60*    (2022.01)
*B82Y 10/00*    (2011.01)

(52) U.S. Cl.
CPC ............ *G06N 10/60* (2022.01); *B82Y 10/00* (2013.01)

(58) Field of Classification Search
None
See application file for complete search history.

(56) References Cited

U.S. PATENT DOCUMENTS

| | | | |
|---|---|---|---|
| 9,152,746 | B2 | 10/2015 | Troyer et al. |
| 10,133,984 | B2 | 11/2018 | Clarke et al. |
| 10,452,989 | B2 | 10/2019 | Majumdar |
| 10,977,546 | B2 * | 4/2021 | Gambetta .............. G06N 10/00 |
| 11,468,357 | B2 | 10/2022 | Johnson et al. |
| 2007/0239366 | A1 | 10/2007 | Hilton et al. |
| 2015/0006443 | A1 | 1/2015 | Rose |
| 2016/0283857 | A1 | 9/2016 | Babbush et al. |
| 2016/0328253 | A1 | 11/2016 | Majumdar |
| 2017/0091649 | A1 | 3/2017 | Clarke et al. |
| 2018/0101784 | A1 | 4/2018 | Rolfe et al. |
| 2018/0260245 | A1 | 9/2018 | Smith |
| 2019/0018912 | A1 | 1/2019 | Mosca et al. |
| 2019/0156239 | A1 | 5/2019 | Martinis et al. |
| 2019/0164034 | A1 | 5/2019 | Gambetta et al. |
| 2020/0005186 | A1 | 1/2020 | Romero et al. |
| 2020/0160204 | A1 | 5/2020 | Johnson et al. |

(Continued)

FOREIGN PATENT DOCUMENTS

KR    20180004226 A    1/2018
KR    20180022925 A    3/2018

(Continued)

OTHER PUBLICATIONS

Bal et al., Matrix product state renormalization, Physical Review B 94, 205122 (2016); Total pp. 14 (Year: 2016).*

(Continued)

*Primary Examiner* — Alan Chen
(74) *Attorney, Agent, or Firm* — Blueshift IP, LLC; Robert Plotkin

(57) ABSTRACT

A quantum computer includes an efficient and exact quantum circuit for performing quantum state compression.

15 Claims, 7 Drawing Sheets

(56) References Cited

U.S. PATENT DOCUMENTS

| | | | | |
|---|---|---|---|---|
| 2021/0081804 A1* | 3/2021 | Stojevic | ............... | G06N 3/088 |
| 2021/0216900 A1* | 7/2021 | Higgott | ............... | G06N 10/00 |
| 2022/0358393 A1 | 11/2022 | Anschuetz et al. | | |

FOREIGN PATENT DOCUMENTS

| | | |
|---|---|---|
| WO | 2005093649 A1 | 10/2005 |
| WO | 2017031356 A1 | 2/2017 |
| WO | 2017116446 A1 | 7/2017 |
| WO | 2017214717 A1 | 12/2017 |
| WO | 2020010147 A1 | 1/2020 |
| WO | 2020037300 A1 | 2/2020 |
| WO | 2020106955 A1 | 5/2020 |
| WO | 2021055507 A1 | 3/2021 |

OTHER PUBLICATIONS

Fishman et al., Compression of correlation matrices and an efficient method for forming matrix product states of fermionic Gaussian states, Physical Review B 92, 075132 (2015), Total pp. 14 (Year: 2015).*

Khoshaman, A., et al., "Quantum Variational Autoencoder", Quantum Physics, pp. 1-12 (Feb. 15, 2018).

Non-Final Office Action dated Jun. 27, 2022, in U.S. Appl. No. 16/460,827 of Jhonathan Romero, filed Jul. 2, 2019, 28 pages.

Notice of Allowance dated May 27, 2022, in U.S. Appl. No. 16/691,015 of Peter D. Johnson, filed Nov. 21, 2019, 19 pages.

Wetzel, S.J., "Unsupervised learning of phase transitions: from principal component analysis to variational autoencoders", Physical Review E, vol. 96, Iss. 2, pp. 1-8 (Aug. 2017).

Anschuetz, E.R., et al., "Variational Quantum factoring," Quantum Technology and Optimization Problems, arXiv preprint arXiv:1808.08927, pp. 1-18 (Aug. 27, 2018).

Calderbank, A.R., et al., "A group-theoretic framework for the construction of packings in grassmannian spaces," Journal of Algebraic Combinatorics, vol. 9, No. 2, pp. 129-140 (1999).

Chao, R., et al., "Overlapping qubits," Quantum Physics, arXiv:1701.01062v1, pp. 1-22 (Jan. 4, 2017).

Crooks, G.E., "Performance of the Quantum Approximate Optimization Algorithm on the Maximum Cut Problem," Quantum Physics, arXiv:1811.08419v1, pp. 1-6, (Nov. 20, 2018).

Farhi, E., et al., "A quantum approximate optimization algorithm," Quantum Physics arXiv:1411.4028v1, pp. 1-16 (Nov. 14, 2014).

Goemans, M.X., and Williamson, D.P., "Improved approximation algorithms for maximum cut and satisfiability problems using semidefinite programming," Journal of the ACM (JACM), vol. 42, No. 6, pp. 1115-1145 (Nov. 1995).

International Search Report & Written Opinion dated Dec. 30, 2020, in international patent application No. PCT/US2020/051115, 9 pages.

International Search Report & Written Opinion dated Mar. 12, 2020 in International patent application No. PCT/US2019/062612, 7 pages.

Johnson, W.B., and Lindenstrauss, J., "Extensions of Lipschitz mappings into a Hilbert space," Contemporary mathematics, vol. 26, No. 1, pp. 189-206 (Jan. 1984).

Karp, R.M., "Reducibility among combinatorial problems," Complexity of computer computations, pp. 85-103 (1972).

Khot, S., "On the power of unique 2-prover 1-round games," Proceedings of the thiry-fourth annual ACM symposium on Theory of computing, pp. 767-775 (May 2002).

Pichler, H., et al., "Quantum optimization for maximum independent set using rydberg atom arrays," arXiv:1808.10816v1, pp. 1-13 (Aug. 31, 2018).

Shor, P.W., and Sloane, N.J.A., "A family of optimal packings in grassmannian manifolds," Journal of Algebraic Combinatorics, vol. 7, No. 2, pp. 157-163 (1998).

Trevisan, L., et al., "Gadgets, approximation, and linear programming," SIAM Journal on Computing, vol. 29, No. 6, pp. 2074-2097 (2000).

Notice of Allowance dated Oct. 20, 2022, in U.S. Appl. No. 16/460,827 of Jhonathan Romero, filed Jul. 2, 2019, 24 pages.

Biamonte, J.D., "Quantum Machine Learning Matrix Product States," arXiv:1804.02398v1, Apr. 6, 2018, 9 pages. [retrieved on Jan. 20, 2020]. Retrieved from<https://arxiv.org/abs/1804.02398v1>.

Bruognolo, "Tensor network techniques for strongly correlated systems: Simulating the quantum many-body wavefunction in zero, one, and two dimensions," LMU PhD Thesis, Jul. 6, 2017, 98 pages. retrieved on Jan. 20, 2020]. Retrieved from <https://www.theorie.physik.uni-muenchen.de/lsvondelft/publications/phd/index.html>.

International Search Report and Written Opinion dated Oct. 23, 2019 by the Korean Intellectual Property Office in International patent application No. PCT/US2019/040406, 8 pages.

International Search Report and Written Opinion dated Jan. 29, 2020, in International Patent Application No. PCT/US2019/046964, 11 pages.

Jozsa, R., et al., "Matchgates and classical simulation of quantum circuits," Proceedings of the Royal Society A: Mathematical, Physical and Engineering Science, 464 (2100):3089-310J., 6, pp. 1-18 (2008).

Kivlichan, I.D. et al., "Quantum simulation of electronic structure with linear depth and connectivity," Physical Review Letters, 120(11):110501, 2018, pp. 1-8 (2018).

Lamata, L., et al., "Quantum autoencoders via quantum adders with genetic algorithms," arXiv:1709.07409 [quant-ph], pp. 1-8 (2018).

McCaskey, A., et al., "Validating Quantum-Classical Programming Models with Tensor Network Simulations," arXiv:1807.07914v1, pp. 1-11 [retrieved on Jan. 20, 2020]. Retrieved from https://arxiv.org/abs/1807.07914v1 (Jul. 20, 2018).

McClean, J.R., et al., "Barren plateaus in quantum neural network training landscapes," Nature communications, arXiv:1803.11173, pp. 1-6 (2018).

Preskill, J., "Quantum Computing in the NISQ era and beyond," arXiv preprint arXiv:1801.00862, pp. 1-20 (2018).

Ramelow, S., et al., "Matchgate quantum computing and non-local process analysis," arXiv:0909.3016v1, pp. 1-11 (2011).

Romero, J. et al., "Quantum autoencoders for efficient compression of quantum data," Quantum Science and Technology, vol. 2 (4):045001, pp. 1-10 (2017).

Wan, K.H., et al., "Quantum generalisation of feedforward neural networks," npj Quantum Information, vol. 3, Article No. 36, arXiv:1612.01045, pp. 1-8 (2017).

\* cited by examiner

QUANTUM COMPUTER WITH EXACT COMPRESSION OF QUANTUM STATES

BACKGROUND

Quantum computers promise to solve industry-critical problems which are otherwise unsolvable. Key application areas include chemistry and materials, bioscience and bioinformatics, and finance. Interest in quantum computing has recently surged, in part, due to a wave of advances in the performance of ready-to-use quantum computers. Although these machines are not yet able to solve useful industry problems, the precipice of utility seems to be rapidly approaching.

Broadly speaking, quantum autoencoders belong to an emerging genre of algorithms called variational quantum algorithms, where a parametrized quantum circuit is used for solving a certain task using a quantum computer and a classical computer is used for optimizing the circuit parameters with respect to some objective function that is efficiently measurable on the quantum computer. A major advantage of the variational quantum algorithm paradigm is that it takes advantage of both classical and quantum computers. This hybrid approach is particularly appealing in the current era of noisy intermediate scale quantum (NISQ) devices, where qubits are expensive and sensitive to error and noise. However, one potential challenge in implementing variational quantum algorithms effectively concerns optimizing the quantum circuit. As the problem size grows, the number of parameters that need to be optimized also grows, giving rise to high-dimensional black-box optimization problems that are difficult to tackle for a classical computer. Such difficulty is rigorously manifested in a recent study showing that the optimization landscape has vanishingly small gradient in most regions. To surmount the problem, one potential solution is to start from an educated initial guess of a good quantum circuit for the problem, a circuit ansatz so to speak, instead of a quantum circuit chosen in a random or ad hoc manner. As an example, for variational quantum eigensolvers (VQE) there are excellent quantum circuit ansatz constructions available for approximating the ground state of a physical system. However, for quantum autoencoders it remains unclear what circuit ansatz may be useful.

SUMMARY

A quantum computer includes an efficient and exact quantum circuit for performing quantum state compression.

Other features and advantages of various aspects and embodiments of the present invention will become apparent from the following description and from the claims.

In a first aspect, a hybrid quantum/classical computer includes a quantum computer component and a classical computer component having a processor, a non-transitory computer-readable medium, and computer program instructions stored on the non-transitory computer-readable medium. The computer program instructions are executable by the processor to cause the classical computer component to perform a first classical subroutine on a plurality of quantum states S related to a system of interest, wherein performing the first classical subroutine includes generating data representing a set S' of matrix product state (MPS) approximations of the plurality of quantum states, and store the data representing the set S' of MPS approximations in the non-transitory computer-readable medium. The computer program instructions are also executable by the processor to cause the classical computer component to perform a second classical subroutine on the data representing the set S' of MPS approximations to generate data representing a quantum circuit U', and storing the data representing the quantum circuit U' in the non-transitory computer-readable medium for use in compressing the plurality of quantum states. The computer program instructions are also executable by the processor to cause the classical computer component to generate data representing a variational quantum circuit U(x) based on the data representing the quantum circuit U', and store the data representing the variational quantum circuit U(x) in the non-transitory computer-readable medium, the data representing the variational quantum circuit U(x) for use in performing a quantum state compression on the plurality of quantum states S with the quantum computer component. The computer program instructions are also executable by the processor to cause the classical computer component and the quantum computer component to perform a quantum circuit training procedure on the data representing the variational quantum circuit U(x) to generate data representing an optimized circuit U* and to store the data representing the optimized circuit U* in the non-transitory computer-readable medium, the data representing the optimized circuit U* for use in compressing the plurality of the quantum states S into states of fewer qubits.

In certain embodiments of the first aspect, the computer program instructions to compress include computer program instructions executable by the processor to exactly compress the plurality of the quantum states S into the states of fewer qubits.

In certain embodiments of the first aspect, the computer program instructions stored on the non-transitory computer-readable medium include computer program instructions executable by the processor to cause the classical computer component to generate data representing a circuit ansatz for performing the exact compression on the plurality of quantum states S. In these embodiments, generating the data representing the circuit ansatz includes (i) selecting a parameter c that comprises an upper bound on a number of qubits on which an operation is performed or compiled on the quantum computer component, (ii) selecting a value of a parameter D such that $D \leq \sqrt{2^{c-1}/M}$, D being an MPS bond dimension specifying an amount of quantum correlation between neighboring qubits captured in the MPS description of the plurality of quantum states S, and M being a selected number of quantum states in the plurality of quantum states S, (iii) causing the classical computer component to generate data representing a set $S_D$ of MPS approximations, the set $S_D$ comprising the set S' of MPS approximations having the MPS bond dimension D, and to store the data representing the set $S_D$ in the non-transitory computer-readable medium, (iv) causing the classical computer component to generate data representing a circuit $U_D$ based on the data representing the set $S_D$ of MPS approximations and causing the classical computer component to store the data representing the circuit $U_D$ in the non-transitory computer-readable medium, (v) causing the classical computer component to generate the data representing the circuit ansatz using the data representing the circuit $U_D$ as a template, and to store the data representing the circuit ansatz in the non-transitory computer-readable medium, for use in exactly compressing $S_D$.

In certain embodiments of the first aspect, the computer program instructions stored in the non-transitory computer-readable medium include computer program instructions executable by the processor to cause the classical computer component to perform a new operations development subroutine to develop data representing new operations with variational parameters θ, using the data representing the circuit $U_D$ as an initial template, and store the data representing the new operations in the non-transitory computer-readable medium. The computer program instructions are further executable to cause the classical computer component to perform a parametrized circuit development subroutine to add the data representing the new operations to data representing the circuit $U_D$ to produce data representing a parametrized circuit U(θ), and store the data representing the parametrized circuit U(θ) in the non-transitory computer-readable medium for use in compressing the plurality of the quantum states.

In certain embodiments of the first aspect, the computer program instructions stored in the non-transitory computer-readable medium further include computer program instructions executable by the processor to cause the classical computer component to perform an entanglement capturing subroutine to generate data representing additional entanglement in the plurality of the quantum states S, the entanglement capturing subroutine having a circuit fine tuning subroutine to generate data representing a fine-tuned version of circuit $U_D$ using additional parameterized operations. The computer program instructions are further executable to cause the classical computer component to store the data representing additional entanglement and the data representing the fine-tuned version of circuit $U_D$ in the non-transitory computer-readable medium for use in generating the data representing the circuit ansatz.

In certain embodiments of the first aspect, the computer program instructions stored in the non-transitory computer-readable medium include computer program instructions executable by the processor to cause the classical computer component to generate data representing the additional parameterized operations with variational parameters θ using the circuit $U_D$ as an initial template. The computer program instructions are further executable to cause the classical computer component to add the data representing the additional parameterized operations to data representing the circuit $U_D$ to produce data representing a parametrized circuit U(θ), and store the data representing the parametrized circuit U(θ) in the non-transitory computer-readable medium for use in compressing the plurality of quantum states.

In certain embodiments of the first aspect, the plurality of quantum states includes a plurality of training states. The data representing a first training state in the plurality of training states is implicitly specified by data representing a Hamiltonian related to the system of interest. The computer program instructions to perform the quantum circuit training include computer program instructions executable by the processor to use the data representing the first training state to represent a ground state of the Hamiltonian in the performing of the quantum circuit training.

In certain embodiments of the first aspect, the data representing the variational quantum circuit U(x) includes data representing quantum gates having an associated plurality of tuning parameters.

In certain embodiments of the first aspect, the system of interest includes optical switching. Furthermore, the data representing the variational quantum circuit U(x) comprises data representing quantum gates having associated tuning parameters corresponding to angles of individual optical elements.

In a second aspect, a method includes performing compression of quantum states with a hybrid quantum-classical computer system having a quantum computer component and a classical computer component with a processor, a non-transitory computer-readable medium, and computer program instructions stored in the non-transitory computer-readable medium. The computer program instructions are executable by the processor to perform the compression by causing the classical computer component to perform a first classical subroutine on a plurality of quantum states S related to a system of interest, wherein performing the first classical subroutine comprises generating data representing a set S' of matrix product state (MPS) approximations of the plurality of quantum states, and storing the data representing the set S' of MPS approximations in the non-transitory computer-readable medium. The computer program instructions are executable by the processor to perform the compression by causing the classical computer component to perform a second classical subroutine on the data representing the set S' of MPS approximations to generate data representing a quantum circuit U', and storing the data representing the quantum circuit U' in the non-transitory computer-readable medium for use in compressing the plurality of quantum states. The computer program instructions are executable by the processor to perform the compression by causing the classical computer component to generate data representing a variational quantum circuit U(x) based on the data representing the quantum circuit U', and storing the data representing the variational quantum circuit U(x) in the non-transitory computer-readable medium, the data representing the variational quantum circuit U(x) for use in performing a quantum state compression on the plurality of quantum states S with the quantum computer component. The computer program instructions are executable by the processor to perform the compression by causing the classical computer component and the quantum computer component to perform a quantum circuit training procedure on the data representing the variational quantum circuit U(x) to generate data representing an optimized circuit U*, and storing the data representing the optimized circuit U* in the non-transitory computer-readable medium for use in compressing the plurality of quantum states S into states of fewer qubits.

In certain embodiments of the second aspect, generating the data representing the variational quantum circuit U(x) includes adding data representing an additional quantum gate with at least one tuning parameter to data representing a gate sequence of the quantum circuit U'.

In certain embodiments of the second aspect, generating the data representing the variational quantum circuit U(x) includes causing the quantum computer component to combine data representing the quantum circuit U' with data representing parameterized gates to generate data representing a parameterized variational quantum circuit, and storing the data representing the parameterized variational quantum circuit in the non-transitory computer-readable medium for use in further optimizing procedures.

In certain embodiments of the second aspect, the set S' of matrix product state approximations of the plurality of quantum states comprises a set S' of n-qubit matrix product states with n>|S'|. The plurality of compressed quantum states S includes a set of $[\log_2|S'|]$-qubit states. Furthermore, compressing the plurality of quantum states S into states of fewer qubits further includes causing the quantum computer component to iteratively apply a (c,c−1)-compression subroutine to perform (c,c−1)-compressions on data representing the n-qubit matrix product states in parallel until a compression threshold is achieved.

In certain embodiments of the second aspect, the compression threshold is achieved when the n-qubit matrix product states act non-trivially on at most a selected number of qubits. The selected number includes a ceiling(log_2|S'|), with the (c,c−1)-compression procedure being a procedure for removing a qubit from the set S', |S'| representing cardinality of the set S', and the ceiling(log_2|S'|) being a smallest integer that is no smaller than log_2|S'|.

In certain embodiments of the second aspect, c is an upper bound on a number of qubits on which an operation is performable or compilable on the quantum computer component.

In a third aspect, a method for compressing a plurality of tensor networks, each formed from all of a plurality of tensors, includes identifying in all of the tensor networks a first subset of the tensors separated from a remaining second subset of the tensors by a boundary. A first total dimension of contracting indices between the first and second subsets across the boundary is identical for all of the tensor networks, and each of the tensors of the first subset is contractable with an external index such that a second total dimension of all the external indices is identical for all of the tensor networks. The method also includes identifying one tensor in the first subset having an external index with a dimension less than or equal to a ratio of (i) the second total dimension, and (ii) a product of the first total dimension and a number of the plurality of tensor networks. The method also includes recasting the first subset of the tensors as a matrix having a number of rows equal to a product of the first total dimension and the number of the plurality of tensor networks, and a number of columns equal to the second total dimension. The method also includes performing QR decomposition on the matrix to obtain a unitary matrix and an upper triangular matrix. The method also includes replacing, in the tensor networks, the first subset of the tensors with the upper triangular matrix to disentangle the identified one tensor from each of the tensor networks.

In certain embodiments of the third aspect, the method includes repeating (i) identifying the first subset, (ii) identifying the one tensor in the first subset, (iii) recasting the first subset, (iv) performing QR decomposition, and (v) replacing the first subset, until either the first subset cannot be identified, or the one tensor in the first subset cannot be identified.

In certain embodiments of the third aspect, the plurality of tensors represents a plurality of quantum states.

In certain embodiments of the third aspect, each of the plurality of quantum states is either a matrix product state or a projected entangled pair state.

In certain embodiments of the third aspect, the method further includes generating one of the plurality of quantum states on a quantum computer with a plurality of entangled qubits. The method further includes compressing said one of the plurality of quantum states by applying to the entangled qubits a unitary transformation implementing an inverse of the unitary matrix.

In certain embodiments of the third aspect, the unitary transformation is parameterized to implement a quantum autoencoder.

In certain embodiments of the third aspect, the method further includes training the quantum autoencoder to compress all of the plurality of quantum states.

In a fourth aspect, a computing system for compressing a plurality of tensor networks, each formed from all of a plurality of tensors, includes a processor and a memory communicably coupled with the processor and storing machine-readable instructions. When executed by the processor, the machine-readable instructions control the computing system to identify in all of the tensor networks a first subset of the tensors separated from a remaining second subset of the tensors by a boundary. A first total dimension of contracting indices between the first and second subsets across the boundary is identical for all of the tensor networks, and each of the tensors of the first subset is contractable with an external index such that a second total dimension of all the external indices is identical for all of the tensor networks. The machine-readable instructions also control the computing system to identify one tensor in the first subset having an external index with a dimension less than or equal to a ratio of (i) the second total dimension, and (ii) a product of the first total dimension and a number of the plurality of tensor networks. The machine-readable instructions also control the computing system to recast the first subset of the tensors as a matrix having a number of rows equal to a product of the first total dimension and the number of the plurality of tensor networks, and a number of columns equal to the second total dimension. The machine-readable instructions also control the computing system to perform QR decomposition on the matrix to obtain a unitary matrix and an upper triangular matrix. The machine-readable instructions also control the computing system to replace, in the tensor networks, the first subset of the tensors with the upper triangular matrix to disentangle the identified one tensor from each of the tensor networks.

In certain embodiments of the fourth aspect, the machine-readable instructions that control the computing system to (i) identify the first subset, (ii) identify the one tensor in the first subset, (iii) recast the first subset, (iv) perform QR decomposition, and (v) replace the first subset, are configured to repeat until either the first subset cannot be identified, or the one tensor in the first subset cannot be identified.

In certain embodiments of the fourth aspect, the plurality of tensors represents a plurality of quantum states.

In certain embodiments of the fourth aspect, each of the plurality of quantum states is either a matrix product state or a projected entangled pair state.

In certain embodiments of the fourth aspect, the computing system also includes a quantum computer communicably coupled with the processor and configured to generate one of the plurality of quantum states on a quantum computer with a plurality of entangled qubits. The quantum computer is also configured to compress the one of the plurality of quantum states by applying to the entangled qubits a unitary transformation implementing an inverse of the unitary matrix.

In certain embodiments of the fourth aspect, the unitary transformation is parameterized to implement a quantum autoencoder.

In certain embodiments of the fourth aspect, the machine-readable instructions are further configured to control the computing system to train the quantum autoencoder to compress all of the plurality of quantum states.

DETAILED DESCRIPTION

Embodiments of the present invention are directed to a quantum computer which includes an efficient and exact quantum circuit for performing quantum state compression. Unlike quantum autoencoders, which need training to learn a compression operation, quantum computers implemented according to embodiments of the present invention are constructed explicitly to compress specific kinds of quantum states. As a result, quantum computers implemented according to embodiments of the present invention do not require training. Embodiments of the present invention may be scaled to handle many-qubit training states.

Furthermore, quantum computers implemented according to embodiments of the present invention may be used to compress states other than specific kinds of quantum states which they were designed to compress, in which case the resulting output may be used as an initial guess based on approximations of the training states.

Embodiments of the present invention are directed to quantum computers which implement exact and efficient techniques for compressing a given set of quantum states. The value of such quantum computers lies in the intersection between quantum computation and information compression. The latter is generally important for improving memory and algorithmic efficiency of computing devices, and the former is a revolutionary technology for handling data in the specific form of quantum states. Because of their quantum mechanical nature, quantum states are in general not known to admit efficient representations on a classical computer, making them hard to store and manipulate with conventional computing technologies. However, quantum computers are able to store and process quantum states efficiently in ways that are not possible with classical computation. A quantum algorithm that is able to compress quantum states therefore may improve the memory and algorithmic efficiency of quantum computers. This has motivated recent interest in quantum autoencoders, where a parametrized quantum circuit is trained to compress a given set of states into states of fewer qubits.

Figure 6A:
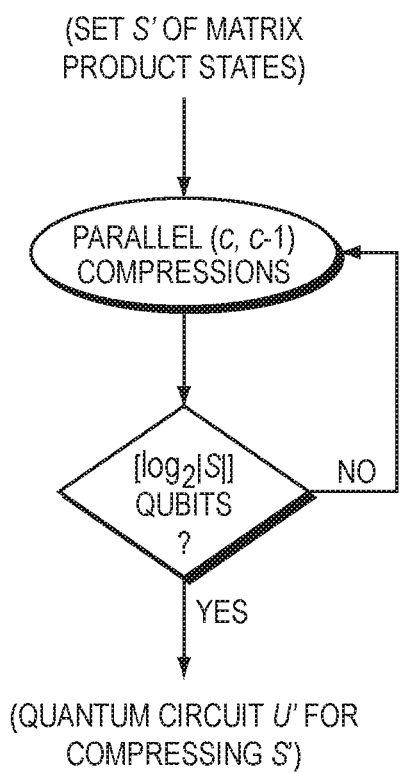
FIGS. 6A and 6B are flowcharts of methods for compressing quantum states according to embodiments of the present invention.

Quantum computers implemented according to embodiments of the present invention address the problem described above of identifying a useful circuit ansatz by starting from simple cases in which the quantum states to be compressed are so well structured that there is an efficient and explicit construction of quantum circuits which exactly compresses them. In these cases, since the circuit is explicitly known, there is no need to train a quantum circuit for the compression. Although in practice the quantum states that need to be compressed may not admit any of the simple structure assumed here, it is nonetheless useful to first compress instead well-structured approximations of the quantum states and to use the compression circuit as an educated initial guess, or an ansatz, for compressing the original set of quantum states. Specifically, one may introduce additional tuning parameters to the circuit ansatz and fine tune the parameters to account for the error incurred in the state approximations used for constructing the ansatz. A method performed by quantum computers implemented according to embodiments of the present invention is shown in FIGS. 6A and 6B.

Because quantum computers implemented according to embodiments of the present invention are direct improvements to quantum autoencoders, their areas of application include, but are not limited to, those of quantum autoencoders, such as:

1. Low dimensional latent space for variational quantum eigensolvers. This allows for fewer tuning parameters in the state preparation for VQE.
2. Quantum state compression for improving the bandwidth of quantum communication. More quantum information may be sent through a quantum communication channel with the same number of qubits if there is a method for compressing the messages.
3. Compression of classical data encoded as quantum states.

Figure 6B:
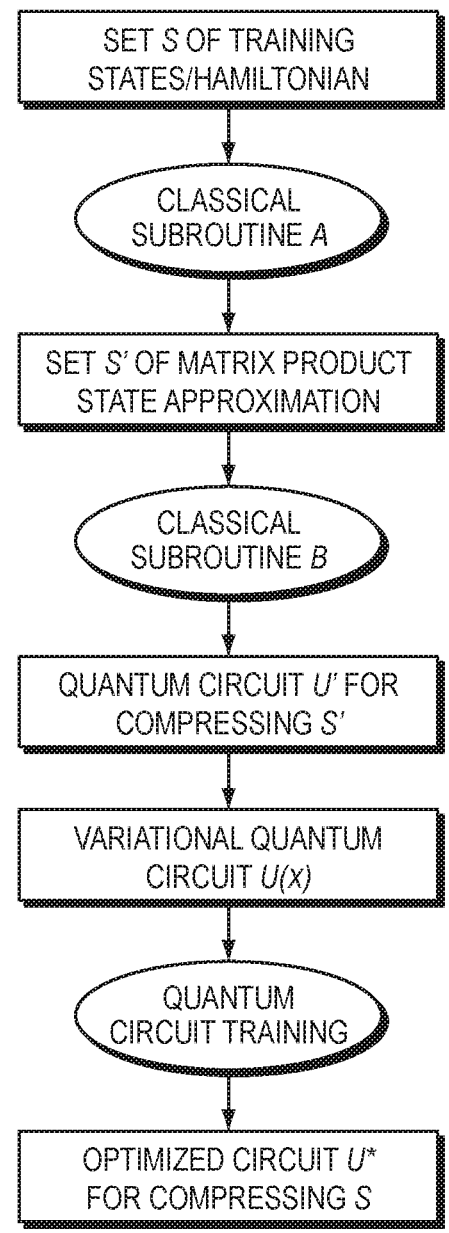

Referring to FIG. 6B, a quantum computer implemented according to an embodiment of the present invention may:

Begin with a set S of training states. One or more of such training states may, for example, be implicitly specified by a Hamiltonian, where the ground state of the Hamiltonian is treated as the training state.

Perform a classical subroutine A, which receives the set of training states S as input, and produces as its output a set S' of matrix product state approximations of the set S of training states. The classical subroutine A may, for example, be any of a variety of existing MPS approximation schemes for the specific setting of the problem.

Perform a classical subroutine B, which receives the set S' of matrix product state approximations as its input, and which produces as its output a description of a quantum circuit U' for compressing the set S'. The classical subroutine B may, for example, be implemented in any of the ways described in Section 2 of the attached document entitled, "Exact compression of quantum states and effective ansatz for quantum autoencoder."

Construct a variational quantum circuit U(x) based on the quantum circuit U'. For example, U(x) may be constructed by taking U' and adding to its gate sequence one or more additional quantum gates with parameters X which are tunable. Hence, U' combined with the parameterized gates from a variational quantum circuit U(x).

Perform quantum circuit training on the variational quantum circuit U(x) such that U(x) compresses the training states S. The output of the quantum circuit training is a description of an optimized circuit U* for compressing the set S of training states.

Apply the optimized circuit U* to compress the set S of training states exactly.

FIG. 6A shows a method performed by a quantum computer implemented according to one embodiment of the present invention for compressing a set S' of n-qubit matrix product states into $[\log_2|S'|]$-qubit states. Starting from the set S' of n-qubit states with n>|S'|, the method iteratively applies (c,c−1)-compression to the states in S' in parallel until the states act non-trivially only on ceiling($\log\_2|S'|$) qubits. Two notes:

(1) the notation |A| represents the cardinality (number of elements) of a set A. Here |S|=|S'|.
(2) The notations in FIG. 6A around "log_2|S|" represent a ceiling function, where ceiling(x) is the smallest integer that is no smaller than x.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a 2n×2n complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled $\in$). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
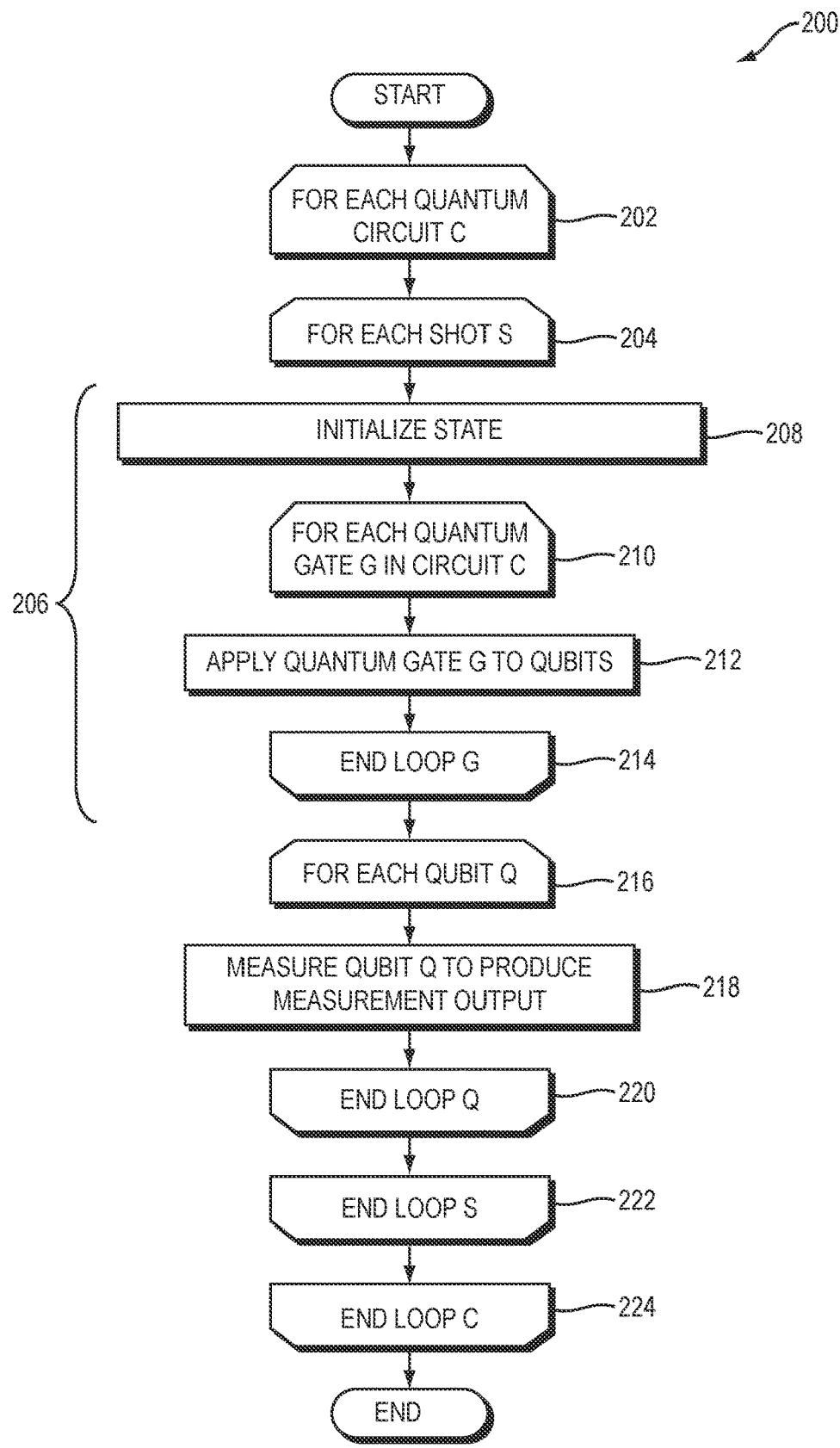
FIG. 2A is a flowchart of a method performed by the quantum computer of FIG. 1 according to one embodiment of the present invention.
Figure 2B:
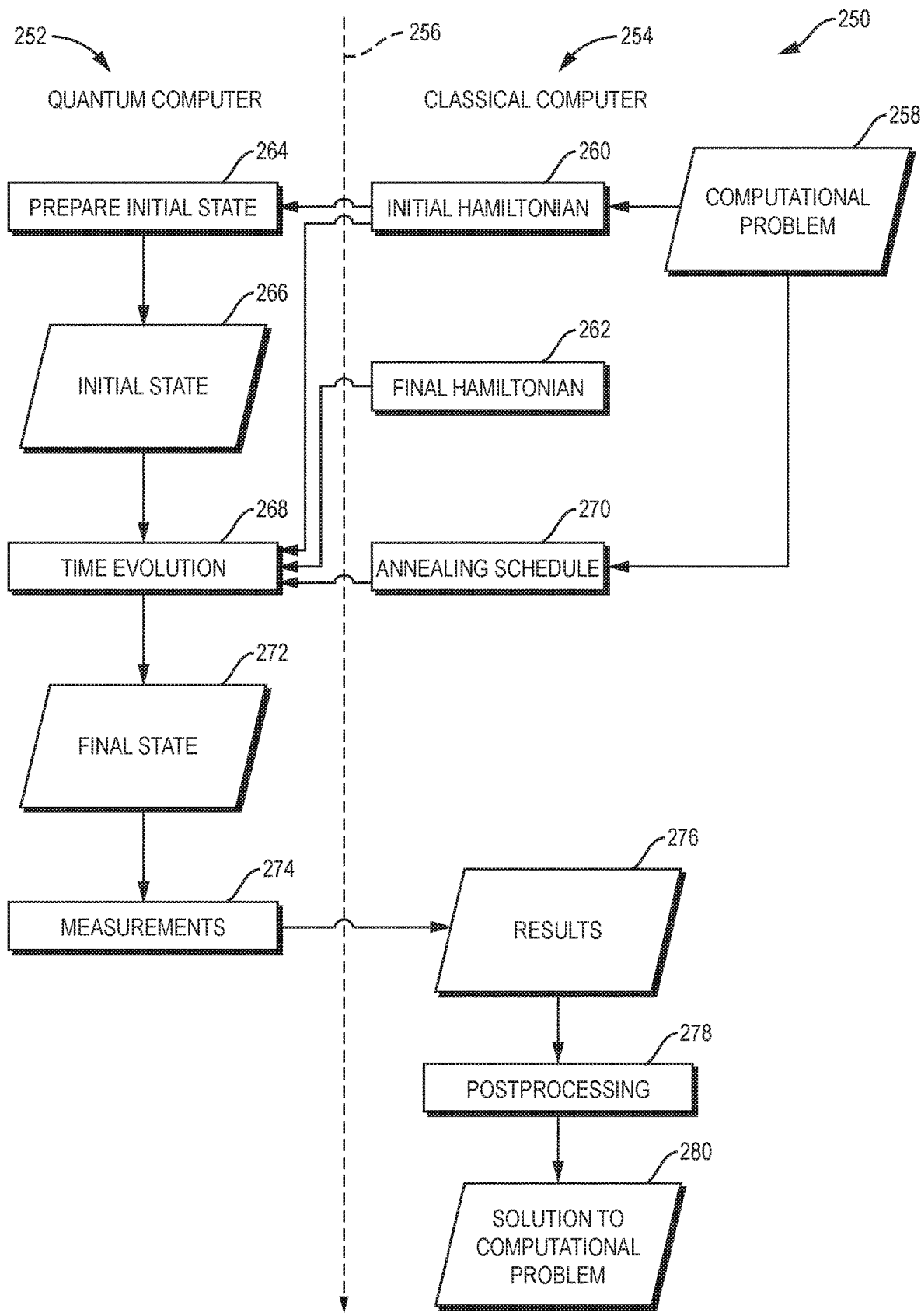
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general, the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Figure 1:
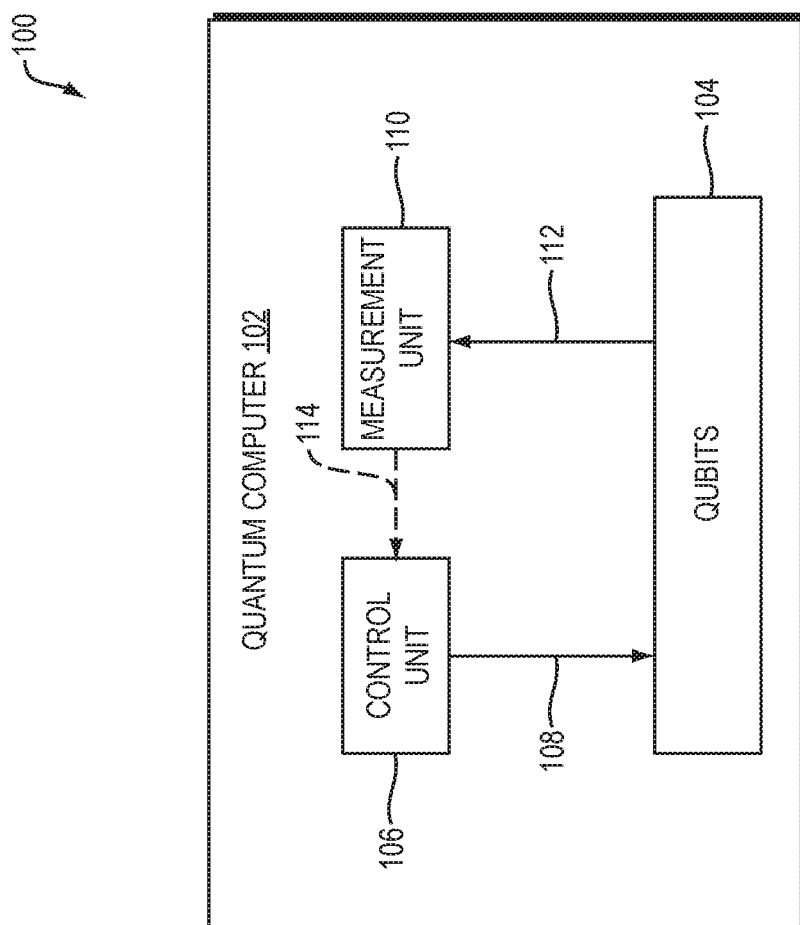
FIG. 1 is a diagram of a quantum computer according to one embodiment of the present invention.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102.

For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:

In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.

In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 104 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
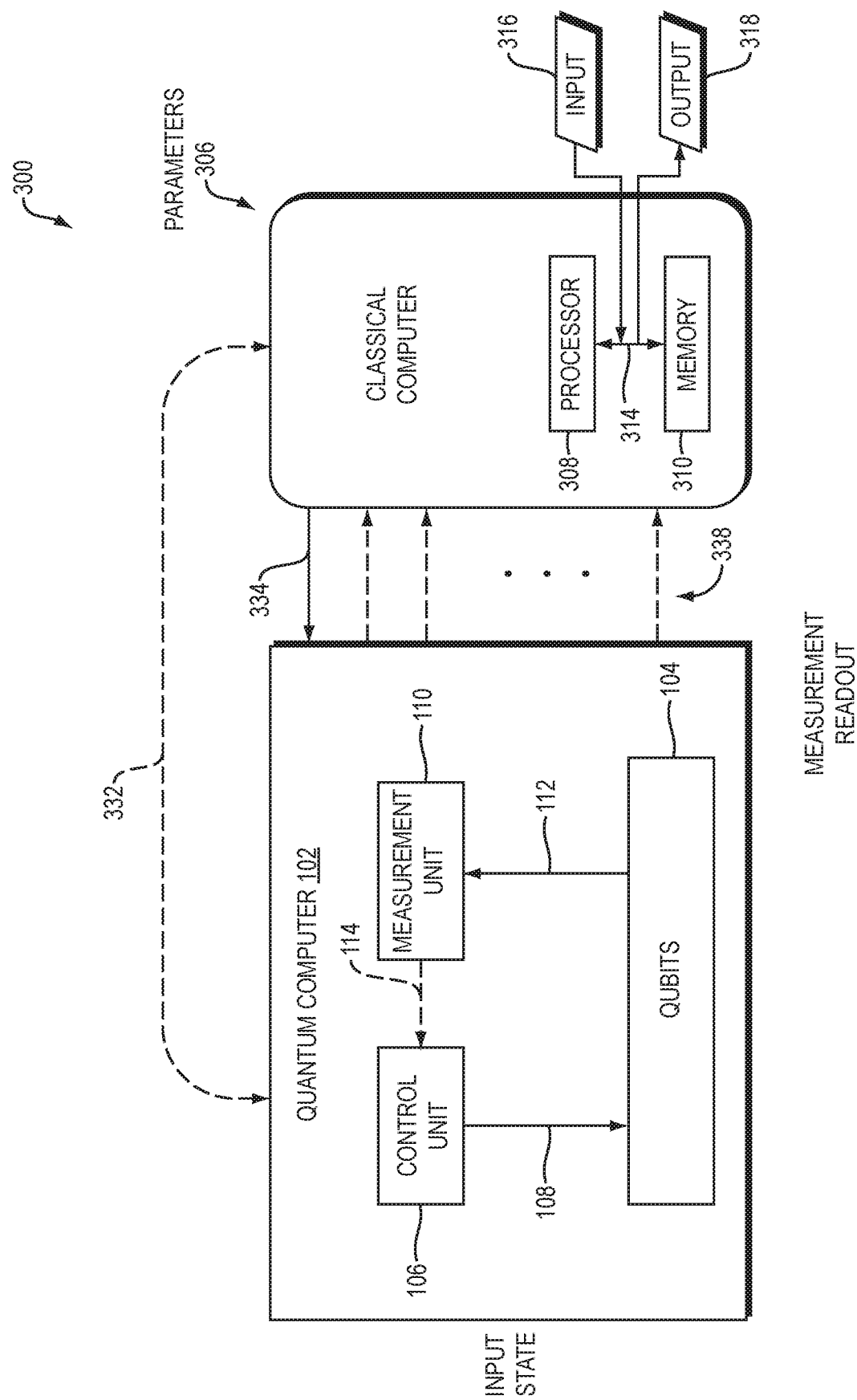
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

The technique described thus far is not restricted to compressing 1D tensor network as is the case for matrix product states. In fact it can be generalized to compressing a general set of M tensor networks $T_1, \ldots, T_M$ each of which can be described as an undirected graph $G_j(V, E_j)$ with a subset of nodes $P \subset V$ such that for all j, the total dimension $D_P$ of the edges K across the cut between P and V\P is the same. (Commonly tensor networks that do not contract to a scalar will have edges that correspond to open indices. Here we ignore these open indices and only consider indices that connect tensors as edges.) See FIG. 4 for an example where M=2 and K=9. For $G_j$, let $D_u$ be the dimension of the index $i_u$ coming out of the tensor node u∈$E_j$. Let $N_{max}$ be the largest dimensional QR factorization that can be handled classically in the setting that the user considers. The criterion for compressibility which in this most general case would be $$D_P M \leq \frac{\prod_{w \in P} D_w}{\min_{w \in P} D_w} \leq \frac{N_{max}}{\min_{w \in P} D_w}.$$

In one example, $N_{max}=2^c$, c=3, M is the number of tensor networks, $$P = \{A^{(k)}, A^{(k+1)}, A^{(k+2)}\} \text{ and } \min_{w \in P} D_w = 2.$$

The general workflow may be summarized as the following:
1. Given a set of tensor networks $S = \{T_1, \ldots, T_M\}$, find a partition P such that the total dimension across the cut is identically $D_P$, and also that the total dimension of edges pointing outwards $\prod_{w \in P} D_w \leq N_{max}$. If no such partition can be found, terminate the algorithm.
2. Find a node u∈P such that $D_P M \leq \prod_{w \in P \setminus \{u\}} D_w$ and perform compression by QR factorization. This step disentangles u for all of the tensor networks in S. If no such partition can be found, terminate the algorithm.
3. Repeat the procedure until one of the previous two steps terminate.

The above algorithm may also parallelized by considering partitions P, P', P", that are disjoint to each other at the same step.

Figure 5:
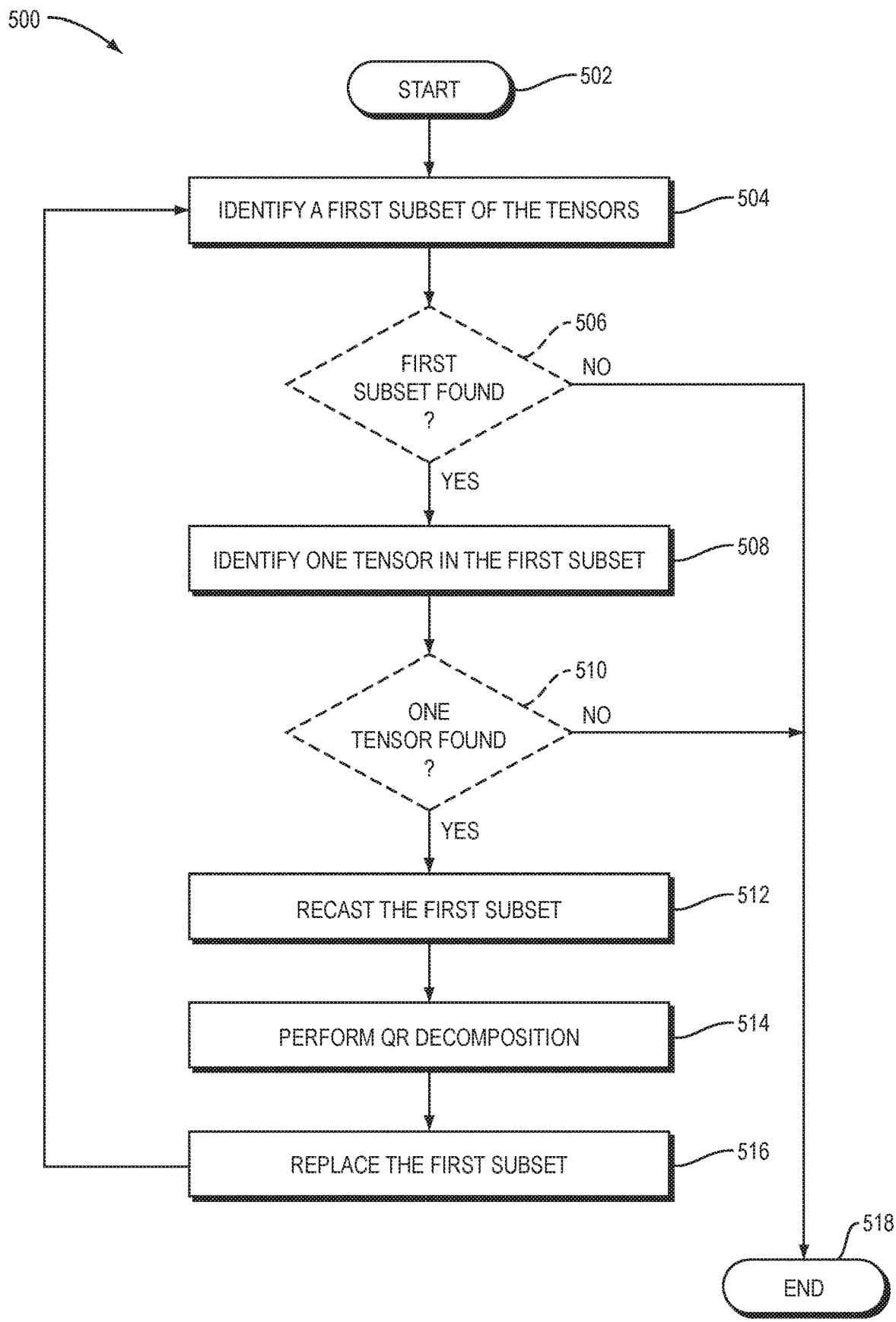
FIG. 5 is a flowchart illustrating a method for compressing a plurality of tensor networks, each formed from all of a plurality of tensors according to an embodiment of the present invention.

FIG. 5 is a flow chart illustrating a method 500 for compressing a plurality of tensor networks, each formed from all of a plurality of tensors. Method 500 may be performed on either a classical computer, or a classical computing component of a hybrid quantum-classical computer. Method 500 starts at a block 502. In a block 502, a first subset of the tensors is identified in all of the tensor networks. The first subset of the tensors is separated from a remaining second subset of the tensors by a boundary. A first total dimension of contracting indices between the first and second subsets across the boundary is identical for all of the tensor networks. Each of the tensors of the first subset is contractable with an external index such that a second total dimension of all the external indices is identical for all of the tensor networks.

Figure 4:
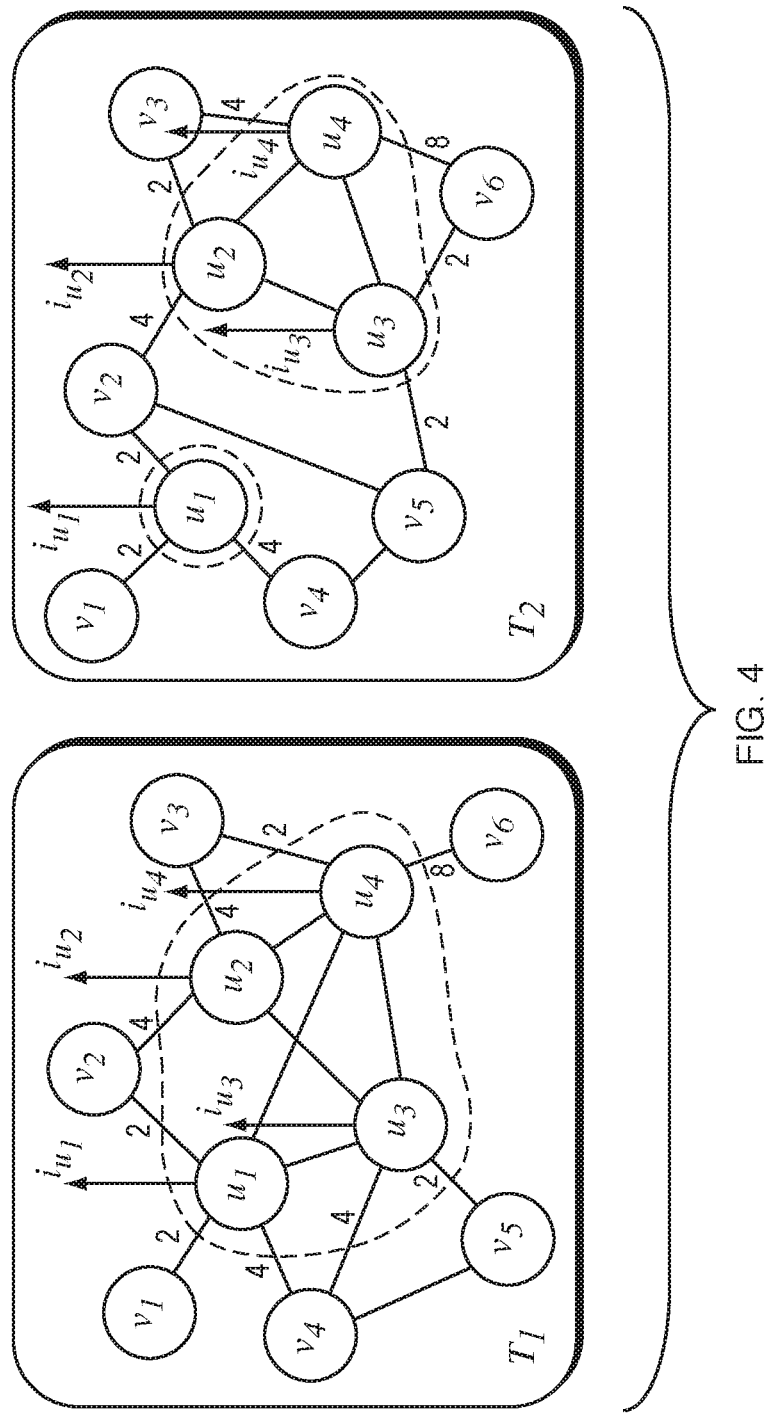
FIG. 4 is a diagram illustrating an example of two tensor networks formed from ten tensors according to an embodiment of the present invention.

FIG. 4 shows an example of two tensor networks formed from ten tensors. In FIG. 4, the first subset includes four tensors (labeled $u_1$ through $u_4$) that are separated from the second subset of remaining tensors (labeled $v_1$ through $v_6$) by a boundary that is indicated as a dashed line. In FIG. 4, each contracting index is shown as an edge connecting two tensors, and each edge is labeled with a dimension of the contracting index (i.e., the number of values the contracting index may have). The first total dimension equals a product of the dimensions of the contracting indices crossing the boundary (i.e., 32,768 for the example of FIG. 4). Note that the first total dimension is the same for all of the tensor networks.

In FIG. 4, each of the four tensors of the first subset is shown with a vertical line indicated an external index (labeled $u_{u_1}$ through $i_{u_4}$) that may be contracted when connected to a tensor. Although not shown in FIG. 4, each external index has a dimension equal to the number of values that the external index may have. The second total dimension equals a product of the dimensions of the external indices.

Method 500 also includes a block 508 in which one tensor of the first subset is identified for disentangling (see block 516). To qualify for disentangling, the one tensor must have an external index with a dimension less than or equal to a ratio of (i) the second total dimension, and (ii) a product of the first total dimension and a number of the plurality of tensor networks. Method 500 also includes a block 512 in which the first subset of the tensors is recast as a matrix having a number of rows equal to a product of the first total dimension and the number of the plurality of tensor networks, and a number of columns equal to the second total dimension. Method 500 also includes a block 514 in which QR decomposition is performed on the matrix to obtain a unitary matrix and an upper triangular matrix. Method 500 also includes a block 516 in which the first subset tensors is replaced, in the tensor networks, with the upper triangular matrix to disentangle the identified one tensor from each of the tensor networks.

In some embodiments, blocks 504, 508, 512, 514, and 516 repeat until either (i) the first subset cannot be identified, or (ii) the one tensor in the first subset cannot be identified. With each iteration, another tensor is disentangled from the first subset such that number of tensors in the first subset is reduced by one. In some of these embodiments, method 500 includes a decision block 506 in which it is determined if the first subset was identified. If not, method 500 continues to a block 518 and ends. If the first subset was identified, then method 500 continues to block 508. The first subset may not be identified when, for example, no subset of the tensors can be found in which the first total dimension is the same for all of the tensor networks.

In some of the embodiments in which blocks 504, 508, 512, 514, and 516 repeat, method 500 also includes a decision block 510 in which it is determined if one tensor in the first subset is identified. If not, method 500 continues to a block 518 and ends. If the one tensor was identified, then method 500 continues to block 512. The one tensor may not be identified when, for example, every tensor in the first subset has, for its external index, a dimension that is greater than the ratio of (i) the second total dimension, and (ii) the product of the first total dimension and the number of tensor networks.

In some embodiments of method 500, the plurality of tensors represents a plurality of quantum states. For example, each of the plurality of quantum states may be a matrix product state or a projected entangled pair state. In some of these embodiments, method 500 further includes generating one of the plurality of quantum states on a quantum computer with a plurality of entangled qubits, and compressing said one of the plurality of quantum states by applying to the entangled qubits a unitary transformation implementing an inverse of the unitary matrix. The unitary transformation may be parameterized to implement a quantum autoencoder. In embodiments in which the quantum autoencoder is implemented, method 500 may also include training the quantum autoencoder to compress all of the plurality of quantum states.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, a quantum computer is required to describe the training states S for even a moderate number of qubits (e.g., 50 or more qubits). Even a classical computer cannot be used to describe the training states S for such a number of qubits, due to the infeasible amount of storage space that would be required. This is merely one example of an aspect of the present invention that is inherently rooted in quantum computing technology and which is either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A hybrid quantum/classical computer comprising:
    a quantum computer component; and
    a classical computer component having a processor, a non-transitory computer-readable medium, and computer program instructions stored on the non-transitory computer-readable medium, the computer program instructions being executable by the processor to:
    (A) cause the classical computer component to perform a first classical subroutine on a plurality of quantum states S related to a system of interest, wherein performing the first classical subroutine comprises generating data representing a set S' of matrix product state (MPS) approximations of the plurality of quantum states, and storing the data representing the set S' of MPS approximations in the non-transitory computer-readable medium;
    (B) cause the classical computer component to perform a second classical subroutine on the data representing the set S' of MPS approximations to generate data representing a quantum circuit U', and store the data representing the quantum circuit U' in the non-transitory computer-readable medium for use in compressing the plurality of quantum states;
    (C) cause the classical computer component to generate data representing a variational quantum circuit U(x) based on the data representing the quantum circuit U', and store the data representing the variational quantum circuit U(x) in the non-transitory computer-readable medium, the data representing the variational quantum circuit U(x) for use in performing a quantum state compression on the plurality of quantum states S with the quantum computer component; and
    (D) cause the classical computer component and the quantum computer component to perform a quantum circuit training procedure on the data representing the variational quantum circuit U(x) to generate data representing an optimized circuit U* and to store the data representing the optimized circuit U* in the non-transitory computer-readable medium, the data representing the optimized circuit U* for use in compressing the plurality of the quantum states S into states of fewer qubits.

2. The hybrid quantum/classical computer of claim 1, wherein the computer program instructions to compress further comprises computer program instructions executable by the processor to exactly compress the plurality of the quantum states S into the states of fewer qubits.

3. The hybrid quantum/classical computer of claim 2, wherein the computer program instructions stored in the non-transitory computer-readable medium further comprise computer program instructions executable by the processor to cause the classical computer component to generate data representing a circuit ansatz for performing the exact compression on the plurality of quantum states S, and wherein generating the data representing the circuit ansatz further comprises:
    selecting a parameter c that comprises an upper bound on a number of qubits on which an operation is performed or compiled on the quantum computer component,
    selecting a value of a parameter D such that $D \leq \sqrt{2^{c-1}/M}$, D being an MPS bond dimension specifying an amount of quantum correlation between neighboring qubits captured in the MPS description of the plurality of quantum states S, and M being a selected number of quantum states in the plurality of quantum states S,
    causing the classical computer component to generate data representing a set $S_D$ of MPS approximations, the set $S_D$ comprising the set S' of MPS approximations having the MPS bond dimension D, and to store the data representing the set $S_D$ in the non-transitory computer-readable medium,
    causing the classical computer component to generate data representing a circuit $U_D$ based on the data representing the set $S_D$ of MPS approximations and causing the classical computer component to store the data representing the circuit $U_D$ in the non-transitory computer-readable medium, and
    causing the classical computer component to generate the data representing the circuit ansatz using the data representing the circuit $U_D$ as a template, and to store the data representing the circuit ansatz in the non-transitory computer-readable medium for use in exactly compressing SD.

4. The hybrid quantum/classical computer of claim 3, wherein the computer program instructions stored in the non-transitory computer-readable medium further comprise computer program instructions executable by the processor to:
    cause the classical computer component to perform a new operations development subroutine to develop data representing new operations with variational parameters θ, using the data representing the circuit $U_D$ as an initial template, and store the data representing the new operations in the non-transitory computer-readable medium, and cause the classical computer component to perform a parametrized circuit development subroutine to add the data representing the new operations to data representing the circuit $U_D$ to produce data representing a parametrized circuit $U(\theta)$, and store the data representing the parametrized circuit $U(\theta)$ in the non-transitory computer-readable medium for use in compressing the plurality of the quantum states.

5. The hybrid quantum/classical computer of claim 3, wherein the computer program instructions stored in the non-transitory computer-readable medium further comprise computer program instructions executable by the processor to:

cause the classical computer component to perform an entanglement capturing subroutine to generate data representing additional entanglement in the plurality of the quantum states S, the entanglement capturing subroutine having a circuit fine tuning subroutine to generate data representing a fine-tuned version of circuit $U_D$ using additional parameterized operations, and cause the classical computer component to store the data representing additional entanglement and the data representing the fine-tuned version of circuit $U_D$ in the non-transitory computer-readable medium for use in generating the data representing the circuit ansatz.

6. The hybrid quantum/classical computer of claim 5, wherein the computer program instructions stored in the non-transitory computer-readable medium further comprise computer program instructions executable by the processor to:

cause the classical computer component to generate data representing the additional parameterized operations with variational parameters $\theta$ using the circuit $U_D$ as an initial template, and cause the classical computer component to add the data representing the additional parameterized operations to data representing the circuit $U_D$ to produce data representing a parametrized circuit $U(\theta)$, and store the data representing the parametrized circuit $U(\theta)$ in the non-transitory computer-readable medium for use in compressing the plurality of quantum states.

7. The hybrid quantum/classical computer of claim 1,
wherein the plurality of quantum states comprises a plurality of training states,
wherein data representing a first training state in the plurality of training states is implicitly specified by data representing a Hamiltonian related to the system of interest, and
wherein the computer program instructions to perform the quantum circuit training further comprise computer program instructions executable by the processor to use the data representing the first training state to represent a ground state of the Hamiltonian in the performing of the quantum circuit training.

8. The hybrid quantum/classical computer of claim 1, wherein the data representing the variational quantum circuit $U(x)$ comprises data representing quantum gates having an associated plurality of tuning parameters.

9. The hybrid quantum/classical computer of claim 1, wherein the system of interest comprises optical switching, and wherein the data representing variational quantum circuit $U(x)$ comprises data representing quantum gates having associated tuning parameters corresponding to angles of individual optical elements.

10. A method comprising:
performing compression of quantum states with a hybrid quantum-classical computer system having a quantum computer component and a classical computer component with a processor, a non-transitory computer-readable medium, and computer program instructions stored in the non-transitory computer-readable medium, the computer program instructions being executable by the processor to perform the compression by:

(A) causing the classical computer component to perform a first classical subroutine on a plurality of quantum states S related to a system of interest, wherein performing the first classical subroutine comprises generating data representing a set S' of matrix product state (MPS) approximations of the plurality of quantum states, and storing the data representing the set S' of MPS approximations in the non-transitory computer-readable medium;

(B) causing the classical computer component to perform a second classical subroutine on the data representing the set S' of MPS approximations to generate data representing a quantum circuit U', and storing the data representing the quantum circuit U' in the non-transitory computer-readable medium for use in compressing the plurality of quantum states;

(C) causing the classical computer component to generate data representing a variational quantum circuit $U(x)$ based on the data representing the quantum circuit U', and storing the data representing the variational quantum circuit $U(x)$ in the non-transitory computer-readable medium, the data representing the variational quantum circuit $U(x)$ for use in performing a quantum state compression on the plurality of quantum states S with the quantum computer component; and (D) causing the classical computer component and the quantum computer component to perform a quantum circuit training procedure on the data representing the variational quantum circuit $U(x)$ to generate data representing an optimized circuit U*, and storing the data representing the optimized circuit U* in the non-transitory computer-readable medium for use in compressing the plurality of quantum states S into states of fewer qubits.

11. The method of claim 10, wherein generating the data representing the variational quantum circuit $U(x)$ further comprises adding data representing an additional quantum gate with at least one tuning parameter to data representing a gate sequence of the quantum circuit U'.

12. The method of claim 10, wherein generating the data representing the variational quantum circuit $U(x)$ further comprises causing the quantum computer component to combine data representing the quantum circuit U' with data representing parameterized gates to generate data representing a parameterized variational quantum circuit, and storing the data representing the parameterized variational quantum circuit in the non-transitory computer-readable medium for use in further optimizing procedures.

13. The method of claim 10,
wherein the set S' of matrix product state approximations of the plurality of quantum states comprises a set S' of n-qubit matrix product states with $n>|S'|$,
wherein the plurality of compressed quantum states S comprises a set of $[\log_2|S'|]$-qubit states, and
wherein compressing the plurality of quantum states S into states of fewer qubits further comprises causing the quantum computer component to iteratively apply a (c,c−1)-compression subroutine to perform (c,c−1)-compressions on data representing the n-qubit matrix product states in parallel until a compression threshold is achieved.

14. The method of claim 10, wherein the compression threshold is achieved when the n-qubit matrix product states act non-trivially on at most a selected number of qubits, the selected number comprising a ceiling(log_2|S'|),
   with the (c,c−1)-compression procedure comprising a procedure for removing a qubit from the set S',
   with |S'| representing cardinality of the set S', and
   with the ceiling(log_2|S'|) comprising a smallest integer that is no smaller than log_2|S'|.

15. The method of claim 13, wherein c comprises an upper bound on a number of qubits on which an operation is performable or compilable on the quantum computer component.

\* \* \* \* \*